US011375655B2

(12) United States Patent
Schoeny et al.

(10) Patent No.: US 11,375,655 B2
(45) Date of Patent: Jul. 5, 2022

(54) SYSTEM AND METHOD FOR DISPENSING AGRICULTURAL PRODUCTS INTO A FIELD USING AN AGRICULTURAL MACHINE BASED ON COVER CROP DENSITY

(71) Applicant: CNH Industrial America LLC, New Holland, PA (US)

(72) Inventors: Christopher Schoeny, Minooka, IL (US); Chad M. Johnson, Arlington Heights, IL (US); Trevor Stanhope, Palos Hills, IL (US); Darian Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 445 days.

(21) Appl. No.: 16/451,592

(22) Filed: Jun. 25, 2019

(65) Prior Publication Data
US 2020/0404832 A1 Dec. 31, 2020

(51) Int. Cl.
*A01B 79/00* (2006.01)
*A01C 7/06* (2006.01)
(Continued)

(52) U.S. Cl.
CPC .............. *A01B 79/005* (2013.01); *A01C 7/06* (2013.01); *A01C 21/005* (2013.01); *G06Q 50/02* (2013.01); *G06T 7/62* (2017.01); *A01C 15/00* (2013.01)

(58) Field of Classification Search
CPC ......... A01B 79/005; A01B 79/00; G06T 7/62; G06T 7/60; G06T 7/00; A01C 7/06;
(Continued)

(56) References Cited

U.S. PATENT DOCUMENTS 9,265,187 B2  2/2016  Cavendar-Bares
9,939,417 B2  4/2018  McPeek
(Continued)

FOREIGN PATENT DOCUMENTS

CN    103278197 A    9/2013
WO    WO2016070195   5/2016

OTHER PUBLICATIONS

Hively, W.D. et al., "Remote Sensing to Monitor Cover Crop Adoption in Southeastern Pennsylvania," Journal of Soil and Water Conservation, vol. 70, No. 6, Nov./Dec. 2018, pp. 340-352.
(Continued)

*Primary Examiner* — Christopher J. Novosad
(74) *Attorney, Agent, or Firm* — Rebecca L. Henkel; Rickard K. DeMille

(57) ABSTRACT

In one aspect, a system for dispensing agricultural products into a field using an agricultural machine may include a metering device configured to control a rate at which an agricultural product is dispensed into the field. Furthermore, the system may include a controller configured to determine a density of a cover crop present within the field as the agricultural machine is moved across the field. Moreover, the controller may be configured to determine an adjustment to be made to the rate at which the agricultural product is being dispensed for use in growing a primary crop within the field based on the determined density. Additionally, the controller may be configured to control the operation of the metering device to execute the adjustment of the rate at which the agricultural product is being dispensed.

20 Claims, 4 Drawing Sheets

(51) Int. Cl.
*G06T 7/62* (2017.01)
*G06Q 50/02* (2012.01)
*A01C 21/00* (2006.01)
*A01C 15/00* (2006.01)

(58) Field of Classification Search
CPC ......... A01C 15/00; A01C 21/005; A01C 7/00; A01C 21/00; G06Q 50/02; G06Q 50/00
See application file for complete search history.

(56) References Cited

U.S. PATENT DOCUMENTS

| | | |
|---|---|---|
| 9,969,492 B2 | 5/2018 | Detweiler et al. |
| 10,151,839 B2 | 12/2018 | McPeek |
| 10,178,828 B2 | 1/2019 | Hendrickson et al. |
| 10,188,025 B2 | 1/2019 | Kirk et al. |
| 10,188,037 B2 | 1/2019 | Bruns et al. |
| 2004/0237394 A1 | 12/2004 | Mayfield et al. |
| 2017/0045488 A1* | 2/2017 | Riess ..................... G01N 33/24 |
| 2018/0025480 A1 | 1/2018 | Dingle et al. |
| 2018/0368338 A1 | 12/2018 | Jerphagnon et al. |

OTHER PUBLICATIONS

Rundquist, Soren et al., "Mapping Cover Crops on Corn and Soybeans in Illinois, Indiana, and Iowa, 2015-2016" Environmental Working Group, Mar. 2017, 26 pages.
"Soil and Crop Sensing," University of Nebraska—Lincoln: Institute of Agriculture and Natural Resources, https://cropwatch.unl.edu/ssm/sensing, accessed Feb. 6, 2019, 7 pages.

\* cited by examiner

SYSTEM AND METHOD FOR DISPENSING AGRICULTURAL PRODUCTS INTO A FIELD USING AN AGRICULTURAL MACHINE BASED ON COVER CROP DENSITY

FIELD OF THE INVENTION

The present disclosure generally relates to agricultural machines and, more particularly, to systems and methods for dispensing agricultural products into a field using an agricultural machine based on the density of the cover crop present within the field across which the machine is being moved.

BACKGROUND OF THE INVENTION

In recent years, the use of cover crop in farming practices has grown dramatically. More specifically, shortly before or after the harvest of a primary or cash crop (e.g., corn, soybeans, and/or the like), many farmers plant cover crop (e.g., grasses, brassicas, legumes, and/or the like) within their fields. The presence of such cover crop helps manage erosion and improve nutrient retention in the soil of the field during the winter months.

The presence of cover crop within the field has an important impact on the amount of nitrogen present within the soil. For example, certain types of cover crop (e.g., grasses and brassicas) may scavenge or absorb nitrogen from the soil. Conversely, other types of cover crops (e.g., legumes) may capture nitrogen from the atmosphere and fix the captured nitrogen in the soil. As such, variations in the density of the cover crop throughout the field may affect the amount of nitrogen available for use by the cash crop once it is planted.

Accordingly, an improved system and method for dispensing agricultural products into a field using an agricultural machine would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for dispensing agricultural products into a field using an agricultural machine. The system may include a metering device configured to control a rate at which an agricultural product is dispensed into the field. Furthermore, the system may include a controller configured to determine a density of a cover crop present within the field as the agricultural machine is moved across the field. Moreover, the controller may be configured to determine an adjustment to be made to the rate at which the agricultural product is being dispensed for use in growing a primary crop within the field based on the determined density. Additionally, the controller may be configured to control the operation of the metering device to execute the adjustment of the rate at which the agricultural product is being dispensed.

In another aspect, the present subject matter is directed to a method for dispensing agricultural products into a field using an agricultural machine. The agricultural machine may include a metering device configured to control a rate at which an agricultural product is dispensed. The method may include determining, with one or more computing devices, a density of a cover crop present within the field as the agricultural machine is moved across the field. Furthermore, the method may include determining, with the one or more computing devices, an adjustment to be made to the rate at which the agricultural product is being dispensed for use in growing a primary crop within the field based on the determined density.

Additionally, the method may include controlling, with the one or more computing devices, the operation of the metering device to execute the adjustment of the rate at which the agricultural product being is dispensed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
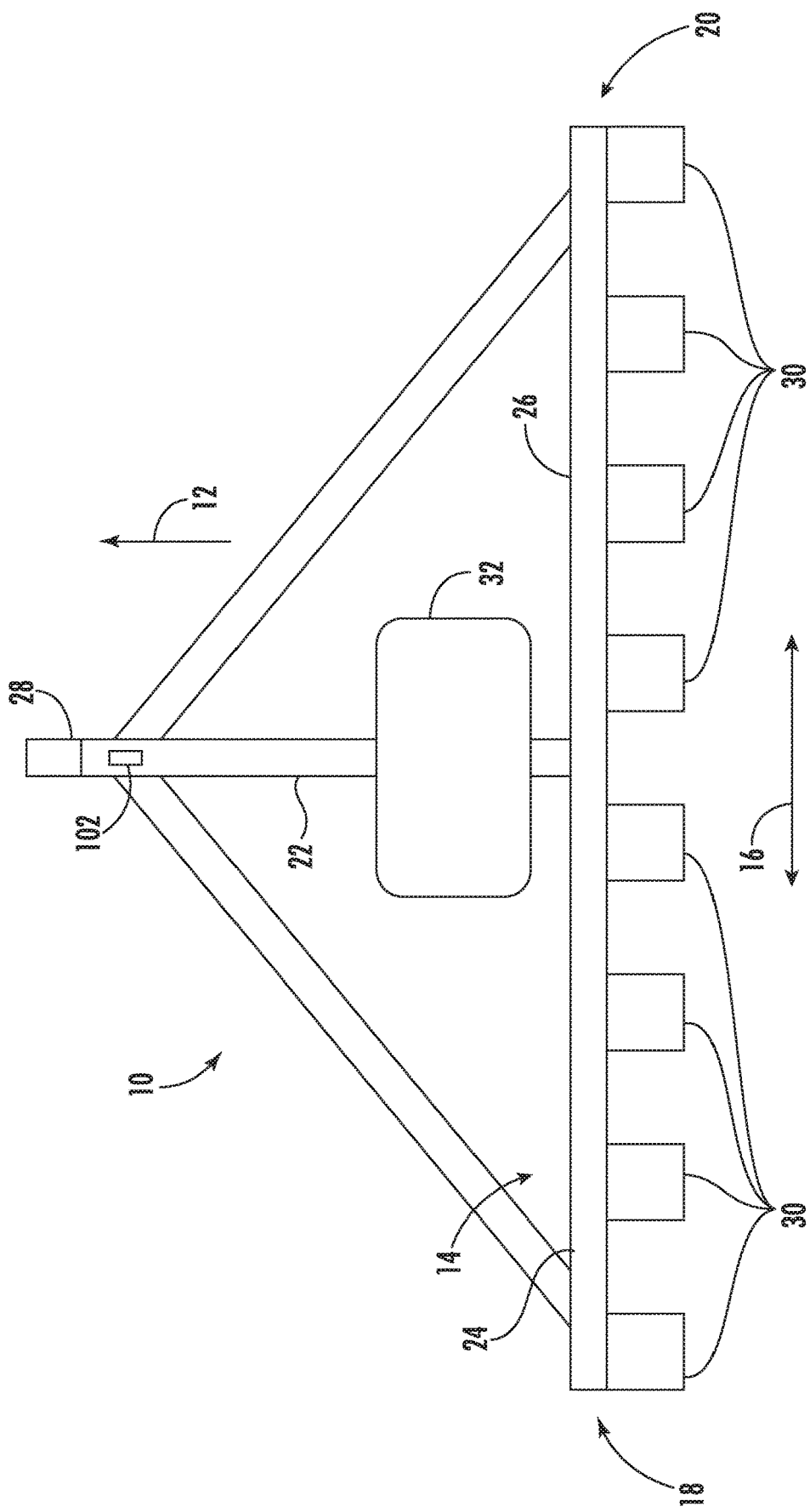
FIG. 1 illustrates a top view of one embodiment of an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for dispensing agricultural products into a field using an agricultural machine. Specifically, in several embodiments, as the agricultural machine travels across a field, a controller of the disclosed system may be configured to determine the density of a cover crop (e.g., grasses, brassicas, legumes, and/or the like) present within the field. For example, in one embodiment, the controller may be configured to determine the density of the cover crop based on a field map stored in its memory or in a remote server database. In another embodiment, the controller may be configured to determine the density of the cover crop based on data received from one or more cover crop sensors (e.g., a vision-based sensor(s)) mounted on the machine and/or an associated work vehicle. In addition, the controller may be further configured to determine the species of the cover crop present within the field (e.g., based on operator input or sensor data).

In accordance with aspects of the present subject matter, the controller may be configured to control the operation of one or more metering devices (e.g., a pump(s), a valve(s), a seed meter(s), and/or the like) of the agricultural machine based on the determined cover crop density. The metering device(s) may, in turn, be configured to dispense an agricultural product (e.g., fertilizer, cash crop seeds, herbicide, insecticide, and/or the like) as the machine travels across the field for use in growing a primary or cash crop (e.g., corn, soybeans, and/or the like). Specifically, in several embodiments, the controller may be configured to may determine an adjustment to be made to the rate at which the agricultural product is being dispensed into the field based on the determined cover crop density. In one embodiment, the controller may be configured to may determine the adjustment to be made to the rate at which the agricultural product is being dispensed based on the determined cover crop density and the determined species of the cover crop present within the field. Thereafter, the controller may be configured to control the operation of the metering device(s) to execute the adjustment of the rate at which the agricultural product is being dispensed.

Referring now to the drawings, FIG. 1 illustrates a top view of one embodiment of an agricultural machine in accordance with aspects of the present subject matter. As shown, in the illustrated embodiment, the agricultural machine is configured as an agricultural implement 10 and, more specifically, a fertilizer-dispensing implement (e.g., a side-dresser). As such, the implement 10 may be configured to be towed across a field in a direction of travel (e.g., as indicated by arrow 12 in FIG. 1). However, in alternative embodiments, the agricultural machine may be configured as any other suitable type of agricultural implement, such as another fertilizer-dispensing implement, a planter or other seed-dispensing implement, a strip tiller, a pull-type sprayer, and/or the like. Moreover, in further embodiments, the agricultural machine may be configured as any suitable type of agricultural vehicle, such as a self-propelled sprayer and/or the like.

As shown, the implement 10 may include a toolbar or frame 14 may include configured to support and/or couple to one or more components of the implement 10. Specifically, in several embodiments, the toolbar 14 may extend along a lateral direction 16 between a first side 18 of the implement 10 and a second side 20 of the implement 10. As shown, the toolbar 14 may include a center section 22 and a pair of wing sections 24, 26. In one embodiment, the wing sections 24, 26 may be pivotably coupled to the center section 22 in a manner that permits the wing sections 24, 26 to fold forward to reduce the lateral width of the implement 10, such as during storage or transportation of the machine 10 on a road. Furthermore, a tow bar 28 may be coupled to the center section 22 to allow implement machine 10 to be towed by a tractor or other suitable work vehicle (not shown).

Additionally, in several embodiments, the implement 10 may include a plurality of row units (or agricultural product-dispensing units) 30 supported on the toolbar 14. In general, each row unit 30 may be configured to dispense an agricultural product (e.g., fertilizer, cash crop seeds, herbicide, insecticide, and/or the like) into a field in which a cover crop (e.g., grasses, brassicas, legumes, and/or the like) is present as the implement 10 is moved across the field. As will be described below, the dispensed agricultural product may, in turn, be used in growing a primary or cash crop (e.g., corn, soybeans, and/or the like) in the field. In this regard, the agricultural product to be dispensed may be stored in one or more hoppers or tanks 32 mounted on or otherwise supported by the toolbar 14. Thus, as agricultural product is dispensed into the field by the row units 30, one or more metering devices 34 (FIG. 3) may control the supply the agricultural product from the tank(s) 32 to the individual row units 30.

It should be appreciated that the implement 10 may include any suitable number of row units 30. For example, the implement 10 may include six, eight, twelve, sixteen, twenty-four, thirty-two, or thirty-six row units 30. In addition, it should be appreciated that the lateral spacing between row units 30 may be selected based on the type of cash crop being planted and/or the type of agricultural product(s) being dispensed.

Furthermore, it should be appreciated that the implement 10 may be configured to dispense any suitable type of agricultural product into the field for use in growing a cash crop in the field. For example, in one embodiment, the agricultural product may be a liquid or granular fertilizer (e.g., nitrogen) that is dispensed into the field for absorption by the cash crop. In another embodiment, the agricultural product may be cash crop seeds that are deposited into furrows formed in the field. Additionally, in a further embodiment, the agricultural product may be a herbicide that is sprayed within the field to "burn down" or otherwise kill the cover crop present within the field before the planting of the cash crop. However, in alternative embodiments, the implement 10 may be configured to dispense any other suitable agricultural product into the field for use in growing the cash crop, such as an insecticide, fungicide, rodenticide, and/or the like.

Moreover, as shown in FIG. 1, a location sensor 102 may be provided in operative association with the implement 10. For instance, as shown in FIG. 1, the location sensor 102 is installed on or within the implement 10. However, in other embodiments, the location sensor 102 may be installed on or within a work vehicle (not shown) configured to tow the implement 10 across the field in the direction of travel 12. In general, the location sensor 102 may be configured to determine the location of the implement 10 and/or the work vehicle using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the implement 10 and/or the vehicle (e.g., in the form coordinates) and stored within the controller's memory for subsequent processing and/or analysis. For instance, based on the known dimensional configuration and/or relative positioning between the implement 10 and the vehicle, the determined location from the location sensor 102 may be used to geo-locate the implement 10 within the field.

Figure 2:
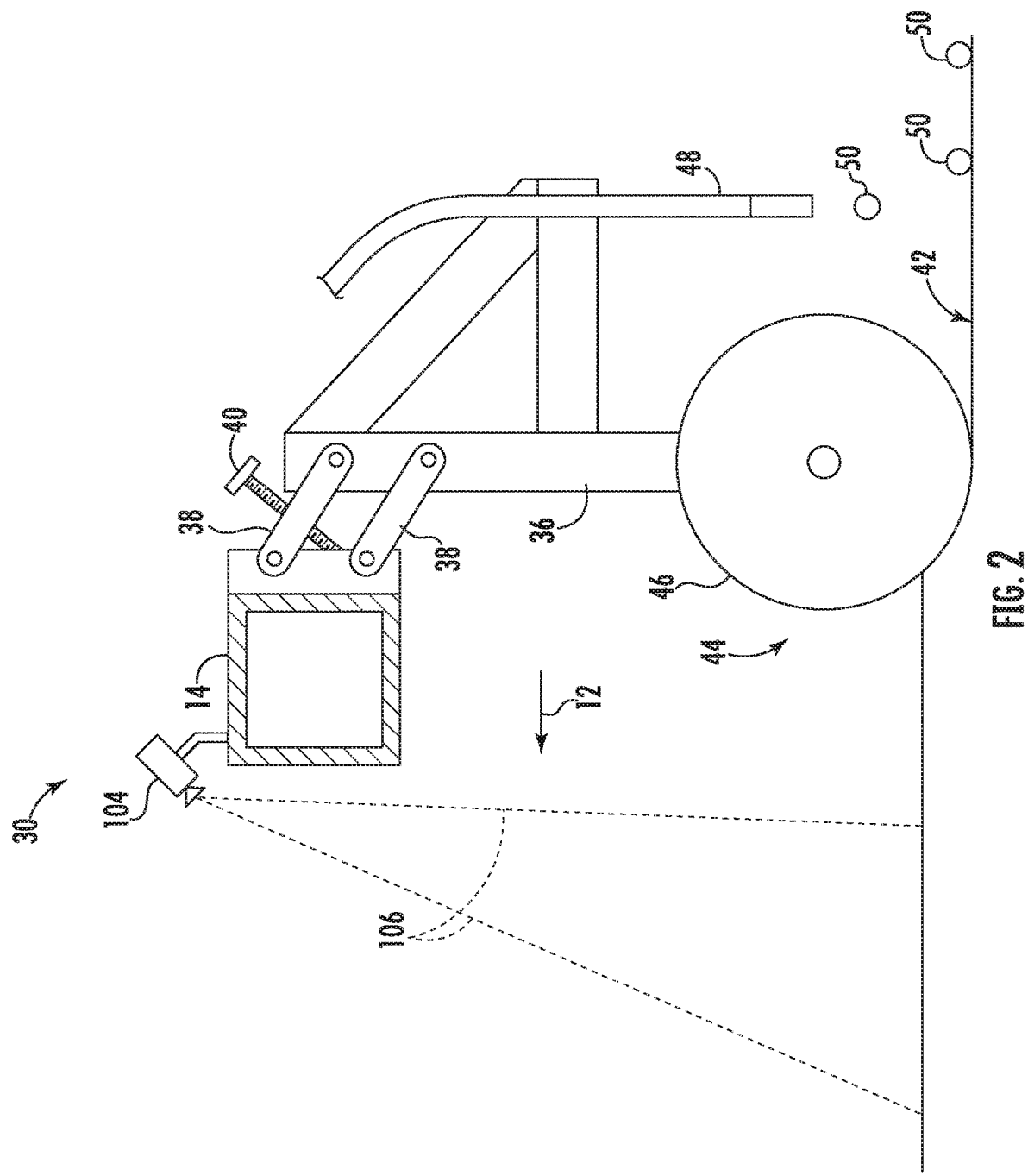
FIG. 2 illustrates a side view of one embodiment of a row unit of an agricultural machine in accordance with aspects of the present subject matter.

Referring now to FIG. 2, a side view of one embodiment of a row unit 30 of the implement is illustrated in accordance with aspects of the present subject matter. As shown, the row unit 30 may include a frame 36 adjustably coupled to the toolbar 14 by links 38. For example, one end of each link 38 may be pivotably coupled to the frame 36, while an opposed end of each link 38 may be pivotably coupled to the toolbar 14. Furthermore, an adjustment mechanism 40 configured to adjust the position of the row unit 30 relative to the toolbar 14. For example, the adjustment mechanism 40 may be configured to move the row unit 30 between an operational position in which the row unit 40 is configured to form a furrow 42 in the soil and a non-operational position in which the row unit 30 is lifted out of the soil. In the illustrated embodiment, the adjustment mechanism 38 corresponds to a screw-like device. However, in alternative embodiments, the adjustment mechanism 40 may correspond to any other suitable device, such as a fluid-driven actuator, electric linear actuator, and/or the like. Furthermore, it should be appreciated that the row unit 30 may be coupled to the toolbar 14 in any other suitable manner.

Furthermore, as shown in FIG. 2, the row unit 30 may also include a furrow-forming device 44. Specifically, in several embodiments, the furrow-forming device 44 may be configured to excavate the furrow 42 in the soil of the field. In this regard, the furrow-forming device 44 may correspond to any suitable tool configured to form the furrow 42. For example, in the illustrated embodiment, the furrow-forming device 44 is configured as a disc or coulter 46 configured to penetrate the surface of the field in a manner that opens or otherwise forms the furrow 42 in the soil as the row unit 30 travels across the field. However, in alternative embodiments, the furrow-forming device 44 may be configured as any other suitable device, such as a knife or hoe.

Moreover, the row unit 30 may include one or more dispensing devices 48 configured to dispense the agricultural product into the field as the implement 10 is moved across the field. Specifically, in several embodiments, the dispensing device(s) 48 may be configured to dispense or otherwise deposit the agricultural product(s) (e.g., fertilizer) into the furrow 42 formed by the furrow-forming device 44. As such, the dispensing device(s) 48 may correspond to any suitable device(s) configured to dispense the agricultural product(s) into the field for use in growing the cash crop. For example, in the illustrated embodiment, the dispensing device 48 is a tube configured to drop or otherwise dispense the pellets/granules of a fertilizer 50 into the furrow 42. However, in alternative embodiments, the dispensing device(s) 48 may be configured as any other suitable type of device(s) configured to dispense the agricultural product into the field, such a nozzle(s).

It should be appreciated that, although the row unit 30 is described above in the context of dispensing a fertilizer into the field, the row unit 30 may be configured in any other suitable manner and/or include any other suitable components that permit the row unit 30 to dispense an agricultural product into the field. For example, as indicated above, in one embodiment, the implement 10 may be configured to dispense cash crop seeds into the field. In such an embodiment, the row unit 30 may be configured as a suitable seed-planting row unit. For instance, such a seed-planting row unit may include a furrow-forming tool(s) (e.g., a disc opener(s) or a hoe(s)) configured to form a furrow in the soil, a seed meter and an associated seed tube configured to meter and dispense the cash crop seeds into the furrow, and a closing disc(s)/wheel(s) configured to close the furrow after the cash crop seeds have been deposited therein. In another embodiment, as indicated above, the agricultural product may be a herbicide or an insecticide. In such an embodiment, the row unit 30 may simply correspond to one or more nozzles configured to spray the herbicide/insecticide on the cover crop present within the field. However, in alternative embodiments, the row unit 30 may be configured in any other suitable manner.

In addition, the implement 10 may include one or more cover crop sensors 104 coupled thereto and/or supported thereon for detecting the density and/or species of the cover crop present within the field across which the implement 10 is being moved. Specifically, in several embodiments, the cover crop sensor(s) 104 may be provided in operative association with the implement 10 such that the sensor(s) 104 has a field of view or sensor detection range directed towards a portion(s) of the field forward of the implement 10. In this regard, the cover crop sensor(s) 104 may be used to capture data associated with the density and/or species of the cover crop present within the field as the implement 10 is moved across the field during the performance of an agricultural operation (e.g., a fertilizing operation, a spraying operation, a seed-planting operation, and/or the like). As will be described below, by analyzing the data captured by the cover crop sensor(s) 104, an associated controller may then be configured to determine the density and/or the species of the cover crop present within in the field. Based on the determined cover crop density and/or species, the controller may, for example, control/adjust the operation of the implement 10, as necessary, to ensure proper application of the agricultural product to the field.

In general, the cover crop sensor(s) 104 may correspond to any suitable sensing device(s) that is configured to detect or capture data indicative of the density and/or species of the cover crop present within the field. For instance, in several embodiments, the cover crop sensor(s) 104 may correspond to a suitable vision-based sensor(s), such as a camera(s) configured to capture three-dimensional images of the cover crop present within the field, thereby allowing the cover crop density to be calculated or estimated and/or the species of the cover crop to be determined by analyzing the content of each image. For instance, in a particular embodiment, the cover crop sensor(s) 104 may correspond to a stereographic camera(s) having two or more lenses with a separate image sensor for each lens to allow the camera(s) to capture stereographic or three-dimensional images. In a further embodiment, the cover crop sensor(s) 104 may correspond to any other suitable sensing device(s) configured to detect or capture cover crop density and/or species data, such as a radio detection and ranging (RADAR) sensor(s), a light detection and ranging (LIDAR) sensor(s), an infrared sensor(s), and/or the like.

It should be appreciated that the cover crop sensor(s) 104 may be mounted on or otherwise installed on the implement 10 and/or the associated work vehicle at any suitable location(s). For example, as shown in FIG. 2, in one embodiment, a cover crop sensor 104 may be installed on the toolbar 14 of the implement 10 such that the sensor 104 has a field of view (e.g., as indicated by dashed lines 106 in FIG. 2) directed towards a portion of the field forward of the implement 10 relative to the direction of travel 12. As such, the cover crop sensor 104 may be configured to capture data indicative of the density and/or species of the cover crop within a portion of the field forward of the implement 10. In another embodiment, a cover crop sensor 104 may be installed on the vehicle (e.g., in addition to or as an alternative to the implement 10) that is configured to tow the implement 10 such that its field of view 106 is directed towards a portion of the field forward of the vehicle and the implement 10 or aft of the vehicle and forward of the implement 10. Moreover, it should be appreciated that, although FIG. 2 illustrates one cover crop sensor 104 installed on the implement 10, any other suitable number of sensors 104 may be installed the implement 10 and/or vehicle, such as two or more sensors 104.

Additionally, it should also be appreciated that the configuration of the agricultural implement 10 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
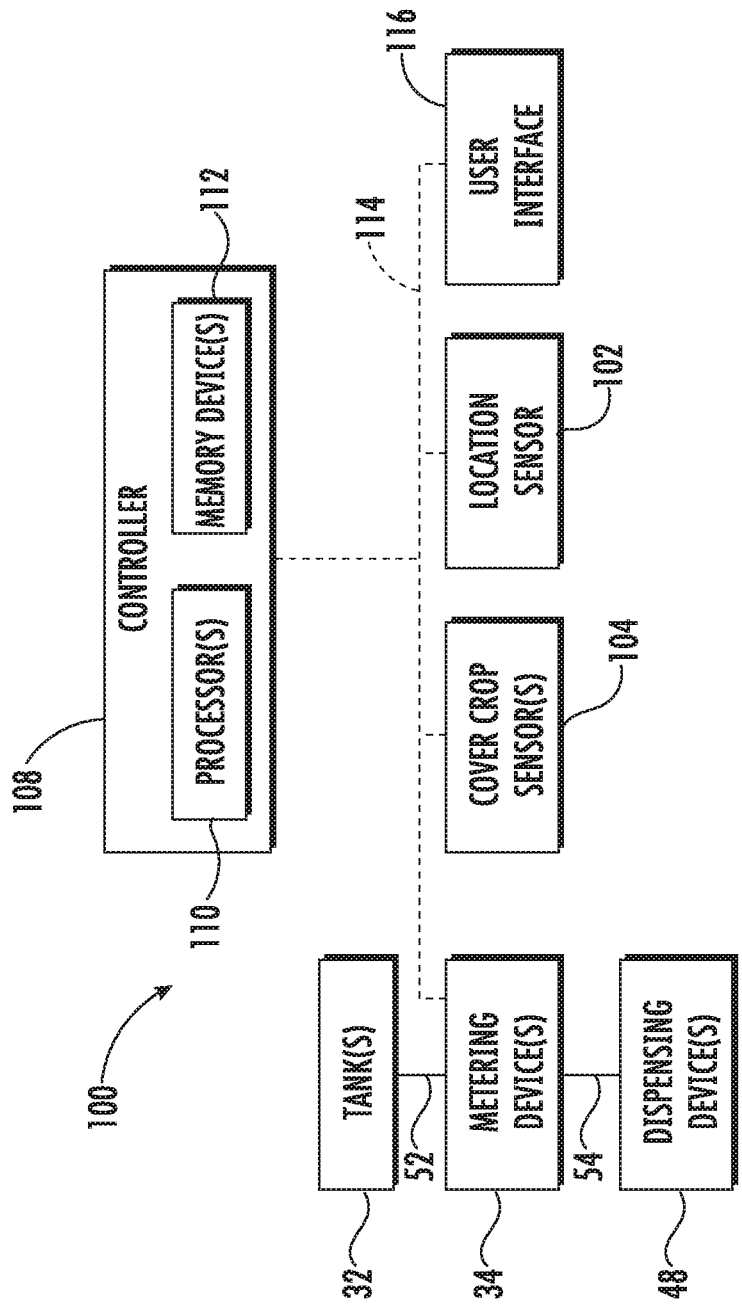
FIG. 3 illustrates a schematic view of one embodiment of a system for dispensing agricultural products into a field using an agricultural machine in accordance with aspects of the present subject matter.

Referring now to FIG. 3, a schematic view of one embodiment of a system 100 for dispensing agricultural products into a field using an agricultural machine is illustrated in accordance with aspects of the present subject matter. In general, the system 100 will be described herein with reference to the agricultural implement 10 described above with reference to FIGS. 1 and 2. However, it should be appreciated by those of ordinary skill in the art that the disclosed system 100 may generally be utilized with agricultural machines having any other suitable machine configuration.

As shown in FIG. 3, the system 100 may include the one or more metering device(s) 34 of the implement 10. In general, the metering device(s) 34 may be configured to control the rate at which the agricultural product(s) is dispensed into the field as the implement 10 is moved across the field. Specifically, in several embodiments, the metering device(s) 34 may be configured to receive the agricultural product from the tank(s) 32 via one or more conduits 52. As such, the metering device(s) 34 may be configured to provide a metered quantity of the agricultural product to the dispensing device(s) 48 for dispensing within the field. For example, in one embodiment, the metering device(s) 34 may be configured to supply the agricultural product to the dispensing device(s) 48 at a particular application rate (e.g., gallons per acre, pounds per acre, etc.). Additionally, as will be described below, the metering device(s) 84 may be controlled to adjust the rate at which the agricultural product(s) is dispensed into the field based on the determined cover crop density and/or species.

It should be appreciated that the metering device(s) 34 may correspond to any suitable device(s) configured to control the rate at which the agricultural product is dispensed into the field. For example, in embodiments in which the agricultural product is a liquid (e.g., a herbicide, an insecticide, or liquid fertilizer), the metering device(s) 34 may correspond to a suitable pump(s) (e.g., a roller pump(s), a centrifugal pump(s), a diaphragm pump(s), a piston pump(s), and/or the like) and/or a valve(s) configured to draw the liquid agricultural product from the tank(s)/hopper(s) 32 and supply this liquid agricultural product to the dispensing device(s) 48 at the desired rate. In such an embodiment, the operation of the pump(s) and/or valve(s) may be adjustable to vary the rate at which the liquid agricultural product is supplied to the dispensing device(s) 48. In embodiments in which the agricultural product is granular (e.g., a granular fertilizer), the metering device(s) 34 may correspond to an adjustable flap(s) configured to adjust the size(s) of an opening(s) defined by the bottom(s) of the tank(s)/hopper(s) 32. In such an embodiment, the rate at which the granular agricultural product exits the tank(s)/hopper(s) 32 may be based on the position(s) of the flap(s) within the opening(s). Furthermore, in embodiments in which the agricultural product corresponds to primary crop seeds, the metering device(s) 34 may correspond to a suitable seed meter(s) configured to receive primary crop seeds from the tank(s)/hopper(s) 32, singulate the received seeds, and provide the singulated seed to the dispensing device(s) 48. In such an embodiment, the operation of the seed meter(s) may be adjustable to vary the rate at which the primary crop seeds are supplied to the dispensing device(s) 48. However, in alternative embodiments, the metering device(s) 34 may correspond to any other suitable device(s).

In accordance with aspects of the present subject matter, the system 100 may include a controller 108 positioned on and/or within or otherwise associated with the implement 10 or the associated work vehicle. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the metering device(s) 34, the location sensor 102, and/or the cover crop sensor(s) 104). For instance, as shown in FIG. 3, a communicative link or interface 114 (e.g., a data bus) may be provided between the controller 108 and the components 34, 102, 104 to allow the controller 108 to communicate with such components 34, 102, 104 via any suitable communications protocol (e.g., CANBUS).

It should be appreciated that the controller 108 may correspond to an existing controller(s) of the implement 10 and/or the associated work vehicle, itself, or the controller 108 may correspond to a separate processing device. For instance, in one embodiment, the controller 108 may form all or part of a separate plug-in module that may be installed in association with the implement 10 and/or the associated work vehicle to allow for the disclosed systems to be implement without requiring additional software to be uploaded onto existing control devices of the implement 10 and/or the associated work vehicle. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as a navigation controller, an implement controller, and/or the like.

Furthermore, in one embodiment, the system 100 may also include a user interface 116. More specifically, the user interface 116 may be configured to provide feedback (e.g., feedback or input associated with the density and/or species of the cover crop present within the field) to the operator of the implement 10. As such, the user interface 116 may include one or more feedback devices (not shown), such as display screens, speakers, warning lights, and/or the like, which are configured to provide feedback from the controller 108 to the operator. The user interface 116 may, in turn, be communicatively coupled to the controller 108 via the communicative link 114 to permit the feedback to be transmitted from the controller 108 to the user interface 116. In addition, some embodiments of the user interface 116 may include one or more input devices (not shown), such as touchscreens, keypads, touchpads, knobs, buttons, sliders, switches, mice, microphones, and/or the like, which are configured to receive user inputs from the operator. In one embodiment, the user interface 116 may be mounted or otherwise positioned within a cab of the work vehicle configured to tow the implement 10 across the field. However, in alternative embodiments, the user interface 116 may mounted at any other suitable location.

In several embodiments, the controller 108 may be configured to control the operation of an agricultural machine such that one or more agricultural products are dispensed in a field as the machine travels across the field. In general, as the implement 10 is moved across a field in which a cover crop (e.g., grasses, brassicas, legumes, and/or the like) is present, the controller 108 may be configured to control the operation of the implement 10 such that one or more agricultural products (e.g., fertilizer, cover crop seeds, herbicides, insecticides, and/or the like) are dispensed into the field. As will be described below, the dispensed agricultural product(s) may, in turn, be used in growing a primary or cash crop (e.g., corn, soybeans, and/or the like) in the field. In this regard, the controller 108 may be configured to control one or more components (e.g., the metering device(s) 34) of the implement 10 such that the agricultural product(s) is dispensed into the field at a desired rate as the implement 10 is moved across the field.

In several embodiments, the controller 108 may be configured to determine the density of a cover crop present within the field across which the agricultural machine is traveling. As mentioned above, the cover crop may be present within the field when the implement 10 is dispensing the agricultural product(s) into the field. In several embodiments, the cover crop may be living when the implement 10 is operated to dispense the agricultural product(s). As such, the density of the cover crop present within the field may necessitate adjustment(s) to the rate(s) or amount(s) of the agricultural product(s) being dispensed in to the field by the implement 10 for use in growing the cash crops. In this regard, and as will be described below, the controller 108 may be configured to actively control the rate(s) at which the agricultural product(s) is dispensed into the field (e.g., by controlling the operation of the metering device(s) 34 of the implement 10) based on the determined cover crop density.

It should be appreciated the determined density of the cover crop may correspond to any suitable parameter indicative of the amount and/or volume of the cover crop present within a given unit of area of the field. For example, the determined cover crop density may correspond to the number of cover crop plants present within a given area of the field (e.g., the number of cover crop plants per square meter). In another embodiment, the determined cover crop density may correspond to the amount of cover crop biomass (e.g., the size/volume of the cover crop plants) present within a given area of the field (e.g., the amount of cover crop biomass per square meter). However, in alternative embodiments, the determined density of the cover crop may correspond to any suitable parameter.

Moreover, in several embodiments, the controller 108 may be configured to determine the density of the cover crop based on a field map. In general, the field map may be stored within the controller's memory 112 and/or in a remote database server (not shown) and include geo-referenced data that is indicative of the density of the cover crop present within the field at such locations. For example, the geo-referenced cover crop density data used to create the field map may be collected during a previously-performed agricultural operation (e.g., a field scouting operation with an unmanned aerial vehicle (UAV) or drone, a seed-planting operation, a harvesting operation, and/or the like). In this regard, as the implement 10 is moved across the field, the controller 108 may be configured to geo-locate the implement 10 within the field based on the data (e.g., coordinates) received from the location sensor 102 (e.g., via the communicative link 132). Thereafter, the controller 108 may be configured to access the field map from its memory 112 and/or the remote database server (e.g., via Wi-Fi, 3G, 4G, LTE, and/or the like) to determine the cover crop density at its current location within the field.

It should be appreciated that, as used herein, a "field map" may generally correspond to any suitable dataset that correlates data to various locations within a field. Thus, for example, a field map may simply correspond to a data table that correlates the density(ies) of the cover crop present within the field to various locations within the field. Alternatively, a field map may correspond to a more complex data structure, such as a geospatial numerical model that can be used to identify variations in the density(ies) of the cover crop and classify such variations into geographic zones or groups. In one embodiment, the controller 108 may be configured to generate a graphically displayed map or visual indicator for display to the operator of the implement 10 (e.g., via the user interface 116).

In another embodiment, the controller 108 may be configured to determine the density of the cover crop present within the field based on received sensor data. As described above, in one embodiment, the implement 10 and/or the associated work vehicle (not shown) may include one or more cover crop sensor(s) 104, with each sensor 104 configured to capture data indicative of the density of the cover crop present within the field. In this regard, as the implement 10 travel across the field, the controller 108 may be configured to receive the data from the cover crop sensor(s) 104 (e.g., via the communicative link 114). Thereafter, the controller 108 may be configured to analyze/process the received data to determine the density of the cover crop present within the field, such as within a portion of the field forward of the implement 10. As such, the controller 108 may include a suitable algorithm(s) stored within its memory 112 that, when executed by the processor 116, determines the density of the cover crop present within the field based on the data received from the cover crop sensor(s) 104.

Additionally, the controller 108 may be configured to determine the species of the cover crop present within the field based on received sensor data. As described above, in one embodiment, the implement 10 and/or the associated work vehicle (not shown) may include one or more cover crop sensor(s) 104. The data captured by the cover crop sensor(s) 104 may be indicative of the species of the cover crop present within the field in addition the cover crop density. In this regard, the controller 108 may be configured to analyze/process the received data to determine the species of the cover crop present within the field, such as within a portion of the field forward of the implement 10. As such, the controller 108 may include a suitable algorithm(s) stored within its memory 112 that, when executed by the processor 116, determines the species of the cover crop present within the field based on the data received from the cover crop sensor(s) 104. However, in alternative embodiments, the controller 108 may be configured to determine the species of the cover crop based on any other suitable data. For example, in one embodiment, controller 108 may determine the species of the cover crop based on an operator input associated with the cover crop species (e.g., an input provided to the user interface 116) and/or the field map stored within its memory 112 or on the remote database server.

Furthermore, in embodiments in which the cover crop density and/or species are determined as the implement 10 is moved across the field to dispense the agricultural product(s), the controller 108 may be configured to generate a field map based on the determined cover crop density values and/or cover crop species determinations. More specifically, as the implement 10 is moved across the field, the controller 108 may be configured to receive location data (e.g., coordinates) from the location sensor 102 (e.g., via the communicative link 114). Based on the known dimensional configuration and/or relative positioning between the field(s) of view of the cover crop sensor(s) 104 and the location sensor 102, the controller 108 may be configured to geo-locate each cover crop density value and/or species determination within the field. For example, in one embodiment, the coordinates derived from the location sensor 102 and the determined cover crop density values and/or species determinations may each be time-stamped. In such an embodiment, the time-stamped data may allow the cover crop density values and/or species determinations to be matched or correlated to a corresponding set of location coordinates received or derived from the location sensor 102. Thereafter, the controller 108 may be configured to generate a field map (e.g., a graphical field map) illustrating cover crop density(ies) and/or species at various positions within the field. For instance, the controller 108 may be configured to execute one or more algorithms stored within its memory 112 that generate the field map based on the determined cover crop density values and/or the cover crop species determinations and the data received from the location sensor 102. In one embodiment, the controller 108 may be configured to transmit instructions to the user interface 116 (e.g., the communicative link 114) instructing the user interface 116 to display the field map (e.g., a graphical field map).

In accordance with aspects of the present disclosure, the controller 108 may be configured to determine an adjustment(s) to be made to the rate(s) at which the agricultural product(s) is being dispensed for use in growing a primary crop within the field. In general, the density and/or the species of the cover crop present within the field may affect the amount or volume of the agricultural product(s) (e.g., fertilizer, primary crop seeds, herbicide, insecticide, and/or the like) needed for use in growing the cash crop. As such, the controller 126 may be configured to determine one or more adjustments to be made to the rate(s) at which the agricultural product(s) is being dispensed by the implement 10 (e.g., via the dispensing device(s) 48) based on the determined cover crop density and/or species.

As indicated above, in one embodiment, the implement 10 may be configured to dispense a fertilizer into the field for use in growing the cash crops. In such an embodiment, the controller 108 may be configured to determine an adjustment to the rate at which the fertilizer is being dispensed into the field by the implement 10 based on the determined cover crop density. For example, when the density of the cover crop present within the field increases, less nutrients (e.g., nitrogen) may be available within the soil for absorption by the cash crop. That is, higher densities of cover crop may absorb more nutrients from the soil than lower densities of cover crop. In this regard, when the determined cover crop density increases (e.g., exceeds a predetermined threshold density value), the controller 108 may be configured to determine that rate at which the fertilizer is being dispensed into the field should be increased. Conversely, when the density of the cover crop present within the field decreases, more nutrients (e.g., nitrogen) may be available within the soil for absorption by the cash crop. That is, lower densities of cover crop may absorb less nutrients from the soil than higher densities of cover crop. As such, when the determined cover crop density decreases (e.g., falls below a predetermined threshold density value), the controller 108 may be configured to determine that rate at which the fertilizer is being dispensed into the field should be decreased.

Moreover, in one embodiment, the controller 108 may be configured to determine an adjustment to the rate at which a nitrogen-based fertilizer is being dispensed into the field by the implement 10 based on the determined cover crop density and the determined cover crop species. For example, when the density of the nitrogen-scavenging cover crop (e.g., grasses and brassicas) present within the field increases and/or the density of a nitrogen-fixing cover crop (e.g., legumes) decreases, less nitrogen may be available within the soil for absorption by the cash crop. In such instances, the controller 108 may be configured to determine that rate at which the nitrogen-based fertilizer is being dispensed into the field should be increased. Conversely, when the density of the nitrogen-scavenging cover crop present within the field decreases and/or the density of a nitrogen-fixing cover crop increases, more nitrogen may be available within the soil for absorption by the cash crop. In such instances, the controller 108 may be configured to determine that rate at which the nitrogen-based fertilizer is being dispensed into the field should be decreased. However, in alternative embodiments, the controller 106 may be configured to determine the adjustment to the rate at which the fertilizer is being dispensed into the field by the implement 10 based on the cover crop density and/or cover crop species in any other suitable manner.

Additionally, as indicated above, in one embodiment, the implement 10 may be configured to dispense primary crop seeds into the field for growing the cash crops. In such an embodiment, the controller 108 may be configured to determine an adjustment to the rate at which the primary crop seeds are being dispensed into the field by the implement 10 based on the determined cover crop density and/or species. For example, when the density of the cover crop present within the field increases, there may be less nutrients and water available within the soil for absorption by the cash crop. That is, higher densities of cover crop may create more competition for the finite amount of nutrients and water present within the soil than lower densities of cover crop. In this regard, when the determined cover crop density increases (e.g., exceeds a predetermined threshold density value), the controller 108 may be configured to determine that rate at which the primary crop seeds are being dispensed into the field should be decreased. Conversely, when the density of the cover crop present within the field decreases, there may be more nutrients and water available within the soil for absorption by the primary or cash crop. That is, lower densities of cover crop may create less competition for the finite amount of nutrients and water present within the soil than higher densities of cover crop. As such, when the determined cover crop density decreases (e.g., falls below a predetermined threshold density value), the controller 108 may be configured to determine that rate at which the primary crop seeds are being dispensed into the field should be increased. However, in alternative embodiments, the controller 108 may be configured to determine the adjustment to the rate at which the primary crop seeds are being dispensed into the field by the implement 10 based on the cover crop density and/or cover crop species in any other suitable manner. Moreover, in one embodiment, the controller 108 may be configured to determine an adjustment to type of primary crop seeds (e.g., seed hybrids, seed species, and/or the like) being dispensed into the field based on the determined cover crop density.

Furthermore, as indicated above, in one embodiment, the implement 10 may be configured to dispense a herbicide into the field for use in growing the cash crops. In such an embodiment, the controller 108 may be configured to determine an adjustment to the rate at which the herbicide is being dispensed into the field by the implement 10 based on the determined cover crop density and/or species. For example, when the density of the cover crop present within the field increases, the amount or volume of herbicide needed to burn down the cover crop may increase. In this regard, when the determined cover crop density increases (e.g., exceeds a predetermined threshold density value), the controller 108 may be configured to determine that rate at which the herbicide is being dispensed into the field should be increased. Conversely, when the density of the cover crop present within the field decreases, the amount or volume of herbicide needed to burn down the cover crop may decrease. As such, when the determined cover crop density decreases (e.g., falls below a predetermined threshold density value), the controller 108 may be configured to determine that rate at which the herbicide is being dispensed into the field should be decreased. However, in alternative embodiments, the controller 108 may be configured to determine the adjustment to the rate at which the herbicide is being dispensed into the field by the implement 10 based on the cover crop density and/or species in any other suitable manner.

It should be appreciated that, in further embodiments, the rate(s) at which any other suitable agricultural products(s), such as insecticides, rodenticide, fungicides, and/or the like, being dispensed into the field by the implement 10 may be adjusted based on the based on the determined cover crop density and/or species.

After the controller 108 has determined the adjustment(s) to be to be made to the rate(s) at which the agricultural product(s) is being dispensed by the agricultural machine, the controller 108 may be configured to control the metering device(s) to execute such adjustment(s). Specifically, in several embodiments, the controller 108 may be configured to automatically adjust one or more operating parameters of the metering device(s) 34 of the implement 10 to execute the adjustment(s) to rate(s) at which the agricultural product(s) is being dispensed. For example, the controller 108 may be configured transmit instructions to the metering device(s) 34 (e.g., via the communicative link 114) instructing the metering device(s) 34 to adjust the rate(s) at which the agricultural product(s) is being supplied to the dispensing device(s) 48 such that the agricultural product(s) is dispensed into the field in accordance with the determined adjustment(s). However, in alternative embodiments, the controller 108 may be configured to control the operation of any other suitable actuator(s) or other device(s) of the implement 10 and/or the associated work vehicle to execute the adjustment(s) to be to be made to the rate(s) at which the agricultural product(s) is being dispensed.

Figure 4:
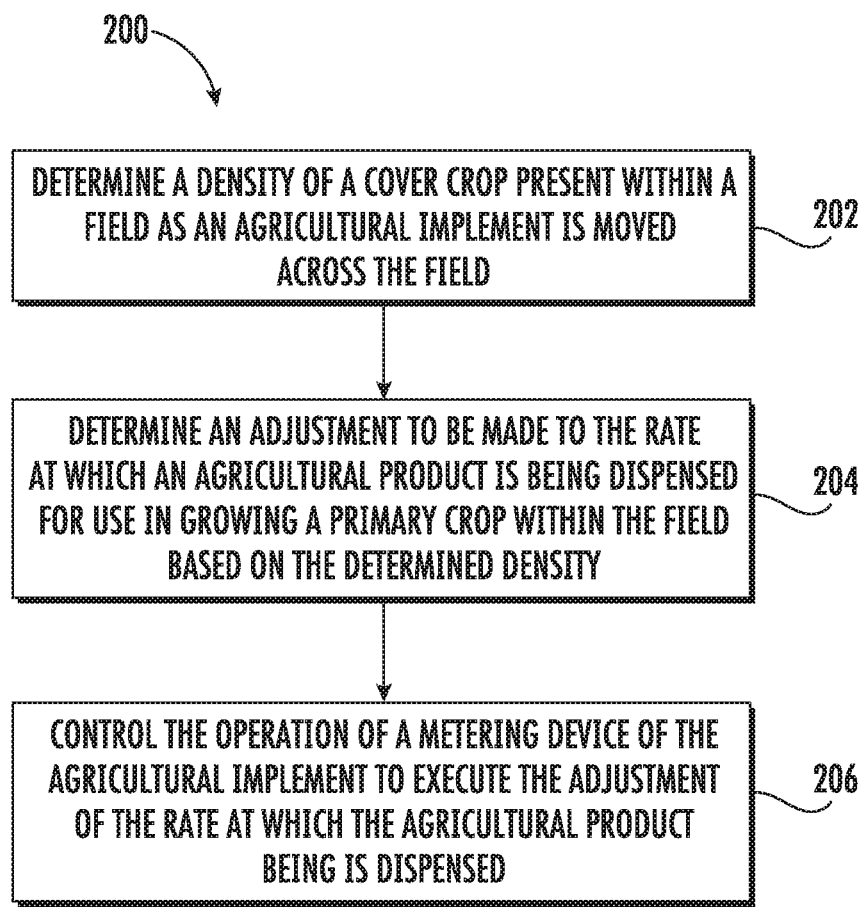
FIG. 4 illustrates a flow diagram of one embodiment of a method for dispensing agricultural products into a field using an agricultural machine in accordance with aspects of the present subject matter.

Referring now to FIG. 4, a flow diagram of one embodiment of a method 200 for dispensing agricultural products into a field using an agricultural implement is illustrated in accordance with aspects of the present subject matter. In general, the method 200 will be described herein with reference to the implement 10 and the system 100 described above with reference to FIGS. 1-3. However, it should be appreciated by those of ordinary skill in the art that the disclosed method 200 may generally be implemented with any agricultural machine having any suitable machine configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining, with one or more computing devices, a density of a cover crop present within a field as an agricultural machine is moved across the field. For instance, as described above, the controller 108 may be configured to determine a density of a cover crop (e.g., grasses, brassicas, legumes, and/or the like) present within the field as the agricultural implement 10 is moved across the field based on, e.g., a stored field map and/or received sensor data.

Additionally, at (204), the method 200 may include determining, with the one or more computing devices, an adjustment to be made to the rate at which an agricultural product is being dispensed for use in growing a primary crop within the field based on the determined density. For instance, as described above, the controller 108 may be configured to determine one or more adjustments to be made to the rate at which an agricultural product (e.g., a fertilizer, cover crop seeds, a herbicide, an insecticide, and/or the like) is being dispensed by the implement 10 for use in growing a primary crop (e.g., corn, soybeans, and/or the like) within the field based on the determined cover crop density.

Moreover, as shown in FIG. 5, at (206), the method 200 may include controlling, with the one or more computing devices, the operation of a metering device of the agricultural machine to execute the adjustment of the rate at which the agricultural product being is dispensed. For instance, as described above, the controller 108 may be configured to control the operation of one or more metering device(s) 34 of the implement 10 to execute the adjustment(s) of the rate at which the agricultural product being is dispensed.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for dispensing agricultural products into a field using an agricultural machine, the system comprising:
    a metering device configured to control a rate at which an agricultural product is dispensed into the field; and
    a controller configured to:
        determine a density of a cover crop present within the field as the agricultural machine is moved across the field;
        determine an adjustment to be made to the rate at which the agricultural product is being dispensed for use in growing a primary crop within the field based on the determined density; and
        control the operation of the metering device to execute the adjustment of the rate at which the agricultural product is being dispensed.

2. The system of claim 1, wherein the controller is further configured to:
    access a field map indicative of the density of the cover crop within the field; and
    determine the density of the cover crop present within the field based on the accessed field map as the agricultural machine is moved across the field.

3. The system of claim 2, wherein the field map comprises a field map generated based on data collected during a previous agricultural operation.

4. The system of claim 1, wherein the controller is further configured to:
    determine a species of the cover crop present within the field; and
    determine the adjustment to be made to the rate at which the agricultural product is being dispensed into the field based on the determined density and the determined species.

5. The system of claim 1, wherein the agricultural product comprises a fertilizer.

6. The system of claim 1, wherein the agricultural product comprises at least one of a herbicide or an insecticide.

7. The system of claim 1, wherein the agricultural product comprises primary crop seeds.

8. The system of claim 1, further comprising:
    a sensor configured to capture data indicative of the density of the cover crop present within the field as the agricultural machine is being moved across the field, the controller being communicatively coupled to the sensor, the controller further configured to:
    receive the captured data indicative of the density of the cover crop present within the field from the sensor; and
    determine the density of the cover crop present within a field based on the received data.

9. The system of claim 8, wherein the sensor has a field of view directed in front of the agricultural machine relative to a direction of travel of the agricultural machine.

10. The system of claim 8, wherein the controller is further configured to generate a field map based on the determined density.

11. The system of claim 8, wherein the sensor comprises a vision-based sensor.

12. A method for dispensing agricultural products into a field using an agricultural machine, the agricultural machine including a metering device configured to control a rate at which an agricultural product is dispensed, the method comprising:
    determining; with one or more computing devices, a density of a cover crop present within the field as the agricultural machine is moved across the field;
    determining, with the one or more computing devices, an adjustment to be made to the rate at which the agricultural product is being dispensed for use in growing a primary crop within the field based on the determined density; and
    controlling, with the one or more computing devices, the operation of the metering device to execute the adjustment of the rate at which the agricultural product being is dispensed.

13. The method of claim 12, further comprising:
    accessing, with the one of more computing devices, a field map indicative of the density of the cover crop within the field, wherein determining the density of the cover crop comprises determining, with the one or more computing devices, the density of the cover crop present within the field based on the accessed field map.

14. The method of claim 13, wherein the field map comprises a field map generated based on data collected during a previous agricultural operation.

15. The method of claim 12, further comprising:
    determining, with the one or more computing devices, a species of the cover crop present within the field, wherein determining the adjustment comprises determining, with the one or more computing devices, the adjustment to be made to the rate at which the agricultural product is being dispensed into the field based on the determined density and the determined species.

16. The method of claim 12, wherein the agricultural product comprises a fertilizer.

17. The method of claim 12, wherein the metering device comprises at least one of a pump or a valve and the agricultural product comprises at least one of a herbicide, an insecticide, or a fertilizer.

18. The method of claim 12, wherein the metering device comprises a seed meter and the agricultural product comprises primary crop seeds.

19. The method of claim 12, further comprising:
receiving, with the one or more computing devices, captured sensor data indicative of the density of the cover crop present within the field, wherein determining the density of the cover crop comprises determining, with the one or more computing devices, the density of the cover crop present within a field based on the received sensor data.

20. The method of claim 19, further comprising:
generating, with the one or more computing devices, a field map based on the determined density.

\* \* \* \* \*